Figure 1:
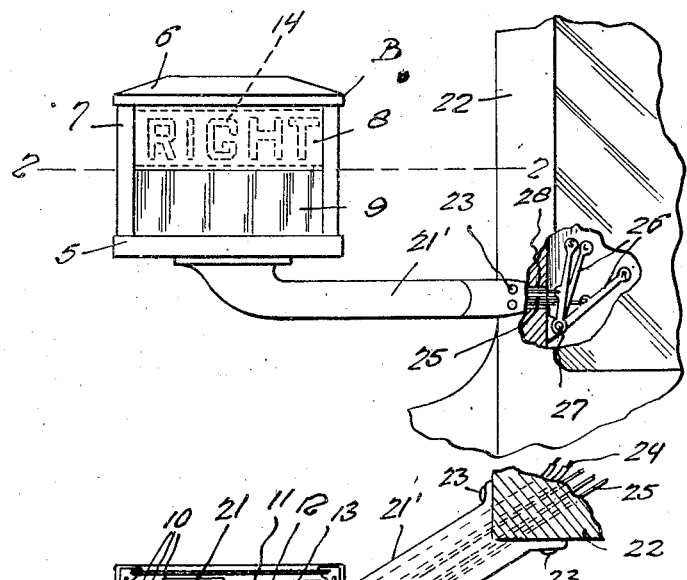

Aug. 17, 1926.

H. E. CORUM 1,596,338

VEHICLE SIGNAL

Filed August 24, 1925

Inventor
H. E. Corum,

Patented Aug. 17, 1926.

1,596,338

UNITED STATES PATENT OFFICE.

HENRY E. CORUM, OF MOSCOW, IDAHO.

VEHICLE SIGNAL.

Application filed August 24, 1925. Serial No. 52,058.

My invention relates to certain improvements in vehicle signals, particularly designed for attachment to and use on automobiles and the like.

The primary object of the invention is to provide a mechanically actuated signal for automobiles and similar vehicles operable to indicate the direction the vehicle is about to take, or the fact that the vehicle is about to stop.

Other objects and advantages relate to the details of construction and operation of the device by which the primary object is attained in a highly efficient and perhaps preferred manner.

Figure 2:
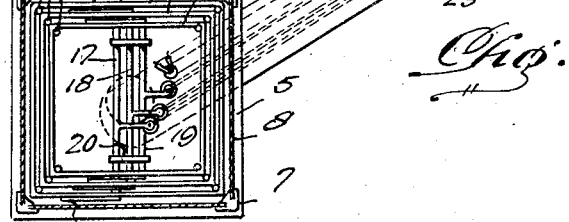
Figure 3:
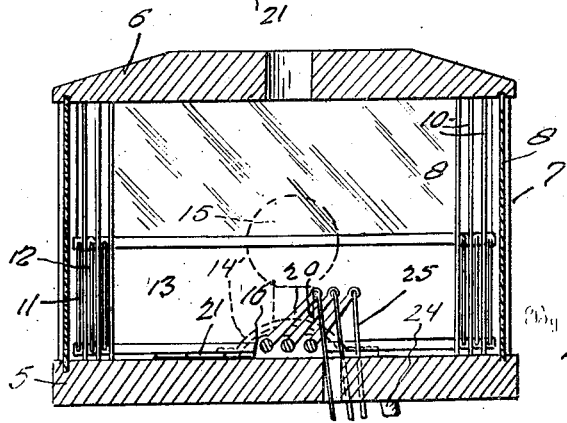

In the drawing,

Figure 1 is an elevation of the signal embodying the features of my invention showing the same attached to a forward corner of a vehicle, Figure 2 is a horizontal section taken substantially on the line 2—2 of Figure 1 looking downwardly, and Figure 3 is a vertical section through the signal.

Referring to the drawing in detail, it will be seen that the signal box is indicated generally by the letter B and includes a bottom 5, a top 6, corner uprights 7, and panels 8 mounted between the corner members 7 to form the walls of the box. These panels 8 are preferably constructed of glass or other suitable transparent material and have their lower halves made non-transparent by a dark paint or the like as is indicated specifically by the numeral 9. In the present embodiment of the invention there are located in each corner of the box B three posts 10 arranged in spaced diagonal relationship as is clearly shown in Figure 2. A signal 11 is slidable vertically in the box B and is disposed about the posts 10 which are outermost. The signal 12 is disposed about the intermediate post 10 in a similar manner, while the signal 13 is disposed in a similar manner about the inner post 10. These signals 11, 12 and 13 are square to conform with the shape of the box, but, of course, may be of any other suitable formation. In the present instance the sides of the signals 11, 12 and 13 are provided with suitable indicia such as is indicated at 14. It will thus be seen that when one of the signals 11, 12 or 13 is raised in the box B, that the indicia thereon may be read through the transparent portion of the panels 8. A bracket 14' is disposed on the bottom 5 for supporting an electric bulb 15 in order that the box may be lighted in the night time.

Journal brackets 16 are mounted on the bottom 5 and have journaled therein crank shafts 17, 18 and 19, each of which includes an actuating crank 20 and end cranks 21. The end cranks 21 of the shafts 17, 18, and 19, are located respectively under signals 11, 12 and 13, so that by rocking the shafts 17, 18 and 19, the respective signal associated therewith may be raised.

A bracket arm 21 is attached to a corner post 22 of a vehicle as at 23 and is hollow for receiving the lead 24 of the electric bulb 15 and for slidably receiving wires 25 attached to the cranks 20 and to levers 26 pivoted on a bracket as at 27 interiorly of the vehicle, the corner post being provided with an opening 28 through which the wires 25 are slidable.

It will be readily apparent that by swinging one of the levers 26 the corresponding wire 25 may be pulled thereby actuating the corresponding crank 20 and rocking the corresponding shafts 17, 18 or 19, for actuating one of the signals or raising the same in order that the indicia thereon may be read through the transparent portion of the panels 8. When the lever 26 is released the weight of the signal will be sufficient to turn the parts to their initial position.

It is thought that the construction, operation and advantages of this invention will now be clearly understood without a more detailed description thereof. Although I have shown and described a particular construction, form, and arrangement of parts as perhaps constituting a preferred embodiment of my invention, I do not desire to limit myself to the same, as many changes may be made in the details of form, construction, arrangement and means of operation, without departing from the spirit or scope of this invention as hereinafter claimed.

Having thus described my invention what I claim as new is:

In a signal structure, a box including a plurality of sides the upper portions of which are transparent and the lower portions non-transparent, a plurality of posts arranged vertically in the box, one in each corner thereof, a signal mounted in the box about the posts, a crank shaft journaled in the bottom of the box and provided with end cranks under the signal, and an actuating crank, and means for operating said operating crank for operating the crank shaft to swing the end cranks and raise the signal in registry with the transparent portions of the sides.

In testimony whereof I affix my signature.

HENRY E. CORUM.